United States Patent
Shintani et al.

(10) Patent No.: US 10,394,519 B2
(45) Date of Patent: Aug. 27, 2019

(54) SERVICE PROVIDING APPARATUS AND METHOD

(71) Applicant: Honda Motor Co., Ltd., Tokyo (JP)

(72) Inventors: Tomoko Shintani, Wako (JP); Hiromitsu Yuhara, Minato-ku (JP); Eisuke Soma, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 15/716,388

(22) Filed: Sep. 26, 2017

(65) Prior Publication Data
US 2018/0101354 A1 Apr. 12, 2018

(30) Foreign Application Priority Data
Oct. 11, 2016 (JP) .................. 2016-200243

(51) Int. Cl.
| | | |
|---|---|---|
| *G06F 3/16* | (2006.01) | |
| *G10L 25/63* | (2013.01) | |
| *G10L 15/30* | (2013.01) | |
| *H04L 29/06* | (2006.01) | |
| *H04W 4/48* | (2018.01) | |

(52) U.S. Cl.
CPC .............. *G06F 3/165* (2013.01); *G06F 3/167* (2013.01); *G10L 15/30* (2013.01); *G10L 25/63* (2013.01); *H04L 67/42* (2013.01); *H04W 4/48* (2018.02)

(58) Field of Classification Search
CPC ......... G10L 15/00; G10L 15/22; G10L 15/26; G10L 25/63; G06F 3/16; G06F 3/167; B60R 16/0373
See application file for complete search history.

(56) References Cited

U.S. PATENT DOCUMENTS

| | | | | |
|---|---|---|---|---|
| 2012/0035924 A1* | 2/2012 | Jitkoff | ................ | G01C 21/3608 704/235 |
| 2013/0030645 A1* | 1/2013 | Divine | ................... | B60K 35/00 701/36 |
| 2014/0099610 A1* | 4/2014 | Bak | .......................... | G06K 9/00 434/236 |
| 2014/0222830 A1* | 8/2014 | Ringer | ................... | G06F 16/487 707/748 |
| 2015/0053066 A1* | 2/2015 | Hampiholi | ............ | B60W 50/14 84/602 |

(Continued)

FOREIGN PATENT DOCUMENTS

| | | |
|---|---|---|
| JP | 2012133530 A | 7/2012 |
| JP | 2012185063 A | 9/2012 |
| JP | 2016137204 A | 8/2016 |

*Primary Examiner* — Paras D Shah
(74) *Attorney, Agent, or Firm* — Duft & Bornsen, PC

(57) ABSTRACT

A service providing apparatus including an occupant detector configured to detect presence of each of a plurality of occupants in a vehicle and a control unit including a CPU and a memory coupled to the memory, wherein the CPU and the memory are configured to perform: estimating an individual feeling of the each of the plurality of occupants detected by the occupant detector; estimating a general mood representing an entire feeling of the plurality of occupants, based on the estimated individual feeling of the each of the plurality of occupants; deciding a service to be provided to a group of the plurality of occupants, based on the estimated general mood; and outputting a command to provide the decided service.

12 Claims, 3 Drawing Sheets

(56) References Cited

U.S. PATENT DOCUMENTS

| | | | |
|---|---|---|---|
| 2016/0042281 A1* | 2/2016 | Cunico | H04L 65/403 706/11 |
| 2016/0089954 A1* | 3/2016 | Rojas Villanueva | G01C 21/3484 701/36 |
| 2016/0328988 A1* | 11/2016 | Gil | G10L 25/63 |
| 2017/0021282 A1* | 1/2017 | Comploi | A63G 25/00 |

* cited by examiner

SERVICE PROVIDING APPARATUS AND METHOD

CROSS-REFERENCE TO RELATED APPLICATION

This application is based upon and claims the benefit of priority from Japanese Patent Application No. 2016-200243 filed on Oct. 11, 2016, the content of which is incorporated herein by reference.

BACKGROUND OF THE INVENTION

Field of the Invention

This invention relates to a service providing apparatus and method which can provide various services to a plurality of occupants in a vehicle.

Description of the Related Art

Conventionally, there is a known apparatus of this type which estimates activity intention of vehicle occupants from their structure and from the gist of their oral interactions collected by in-cabin microphones, decides what service to recommend to the occupants based on the estimated activity intention, and provides the service decided. Such an apparatuses is described in Japanese Unexamined Patent Publication No. 2012-133530 (JP2012-133530A), for example.

However, when the service provided is decided based on the content of occupant conversations as in the apparatus described in JP2012-133530A, it is difficult to offer a high degree of satisfaction to car occupants as a group because some of the occupants, for example, those who do not join the conversation, are apt to be displeased with the provided service.

SUMMARY OF THE INVENTION

An aspect of the present invention is a service providing apparatus including: an occupant detector configured to detect presence of each of a plurality of occupants in a vehicle; and a control unit including a CPU and a memory coupled to the memory, wherein the CPU and the memory are configured to perform: estimating an individual feeling of the each of the plurality of occupants detected by the occupant detector; estimating a general mood representing an entire feeling of the plurality of occupants, based on the estimated individual feeling of the each of the plurality of occupants; deciding a service to be provided to a group of the plurality of occupants, based on the estimated general mood; and outputting a command to provide the decided service.

Another aspect of the present invention is a service providing apparatus including: an occupant detector configured to detect presence of each of a plurality of occupants in a vehicle; an individual feeling estimator configured to estimate an individual feeling of the each of the plurality of occupants detected by the occupant detector; a general mood estimator configured to estimate a general mood representing an entire feeling of the plurality of occupants, based on the individual feeling of the each of the plurality of occupants estimated by the individual feeling estimator; a service decider configured to decide a service to be provided to a group of the plurality of occupants, based on the general mood estimated by the general mood estimator; and a command outputter configured to output a command to provide the service decided by the service decider.

Further aspect of the present invention is a service providing method including: detecting presence of each of a plurality of occupants in a vehicle; estimating an individual feeling of the each of the plurality of occupants detected; estimating a general mood representing an entire feeling of the plurality of occupants, based on the estimated individual feeling of the each of the plurality of occupants; deciding a service to be provided to a group of the plurality of occupants, based on the estimated general mood; and outputting a command to provide the decided service.

BRIEF DESCRIPTION OF THE DRAWINGS

The objects, features, and advantages of the present invention will become clearer from the following description of embodiments in relation to the attached drawings, in which.

DETAILED DESCRIPTION OF THE INVENTION

Figure 1:
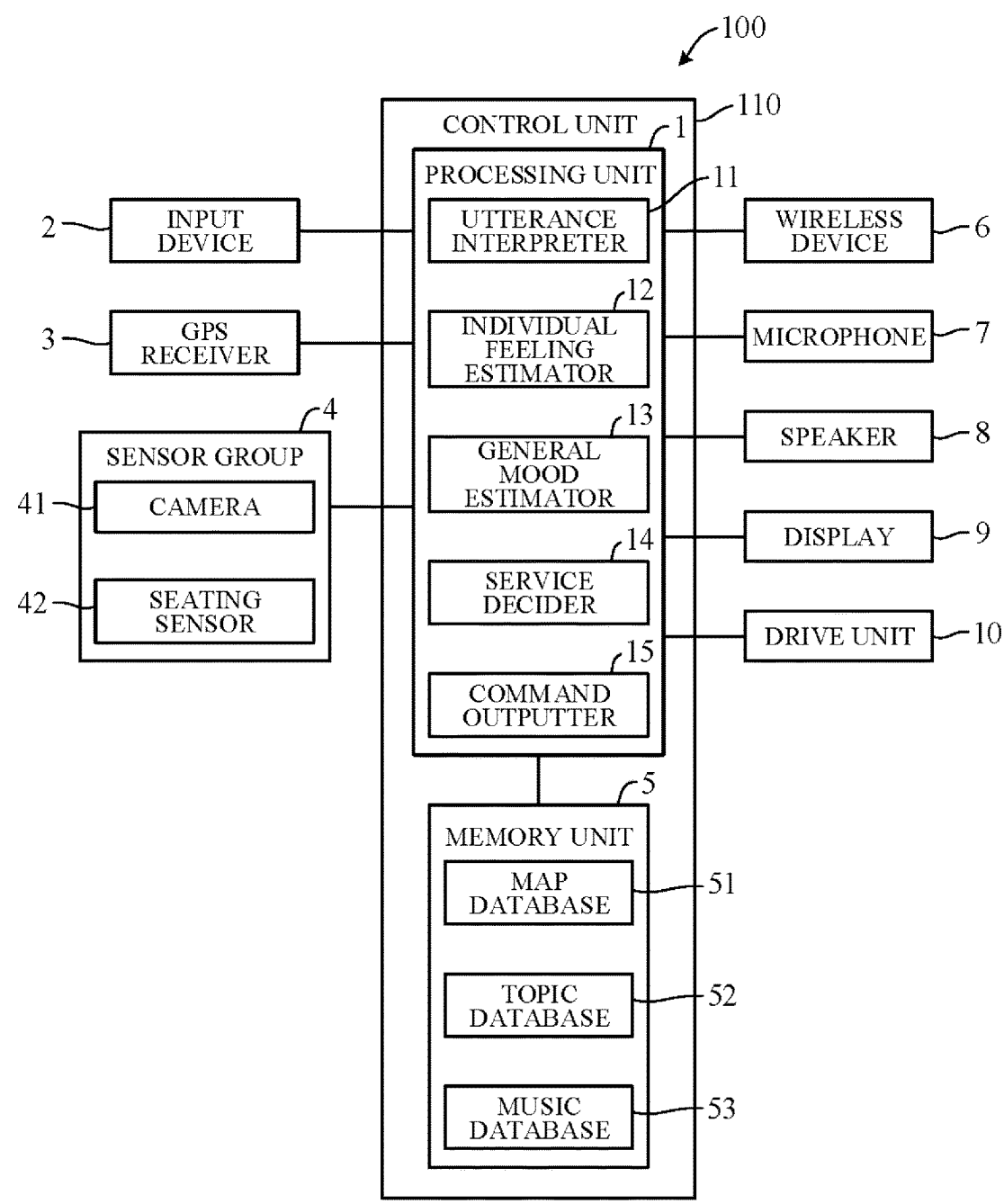
FIG. 1 is a block diagram showing schematically a configuration of a service providing apparatus according to an embodiment of the present invention.

Hereinafter, an embodiment of the present invention is explained with reference to FIGS. 1 to 3. FIG. 1 is a block diagram showing schematically a configuration of a service providing apparatus 100 according to an embodiment of the present invention. The service providing apparatus 100 is an apparatus capable of providing various services to car occupants, which is, for example, configured using a navigation apparatus installed in the vehicle.

As shown in FIG. 1, the service providing apparatus 100 has a control unit 110 including a processing unit 1 and a memory unit 5 coupled to the processing unit 1. To the processing unit 1 are connected an input device 2, a GPS receiver 3, a sensor group 4, a memory unit (memory) 5, a wireless device 6, microphones 7, a speaker 8, a display 9, and a drive unit 10.

The input device 2 includes various switches operated by an occupant (for example, driver). Alternatively, the input device 2 can be configured as a touch panel provided on the display screen of the display 9. Information and various commands corresponding to operation of the input device 2 are input to the processing unit 1.

The GPS receiver 3 receives position determination signals from GPS satellites and calculates current position of the vehicle. Signals from the GPS receiver 3 are input to the processing unit 1.

The sensor group 4 includes cameras 41 and seating sensors 42. The cameras 41 have CCD sensors, CMOS sensors or other image sensors that image upper body and face of occupants. The cameras 41 are provided in association with individual occupant riding positions (seat positions) so that every car occupant's facial expression and posture can be imaged. The seating sensors 42 are pressure sensors installed at the individual seats, and whether or not an occupant is seated in a particular seat can be distinguished from detection value of the associated seating sensor 42. Therefore, the detection values of the seating sensors 42 can be used to detect the number of occupants in the car and, in addition, to distinguish occupant build, gender, age (e.g., whether adult or child), and other traits. Signals from the sensor group 4 are input to the processing unit 1.

The memory unit 5 includes ROM, RAM and the like, and has, inter alia, a map database 51 storing map data, a topic database 52 storing various topics, and a music database 53 storing music. The map database 51 stores map data including, for example, road map data and facility data. The topic database 52 stores various topics likely come up in conversations among occupants, including, for example, topics related to traffic, weather, current affairs and similar, and topics related to food, hobbies, travel, work, family and similar. The music database 53 stores music of various genres including, for example, Western, Japanese, jazz and classical. The processing unit 1 reads information stored in the memory unit 5 as required.

The wireless device 6 communicates with a mobile telephone network, an Internet connection or other wireless public channel. It is also capable of short range wireless communication with smartphones and other mobile terminals present in the car. Data stored in the memory unit 5 can be updated with periodically captured topic data, music data and other data received from external servers and other sources through the wireless device 6. Also it is possible to update data stored in the memory unit 5 with topic data, music data and other data read in through the wireless device 6 every time data capture is instructed through the input device 2.

The microphones 7 pick up utterances of occupants. Voice signals from the microphones 7 are passed through an A/D converter, for example, and input to the processing unit 1 as voice data. The microphones 7 have narrow directivity, so their voice pick-up sensitivity differs with direction. The microphones 7 are provided in association with individual occupant seat positions, whereby presence or absence of utterances by individual occupants can be distinguished.

In response to commands from the processing unit 1, the speaker 8 produces audio output conveying map information, topics, music and other content stored in the memory unit 5. When an occupant uses the input device 2 or a microphone 7 to request audio output, audio is provided by the speaker 8 in accordance with the request. The speaker 8 is also capable of automatically providing audio in response to a command from the processing unit 1, even when no request for audio output is made by an occupant.

The display 9 displays destination setting information, route-to-destination guidance, current position on route information, and the like. Content displayed on the display 9 is controlled by the processing unit 1.

"Drive unit 10" is a generic term covering actuators for driving equipment affecting occupant comfort. For example, the drive unit 10 includes a motor and/or compressor of an air conditioner, as well as motors for opening and closing windows and a sunroof.

The processing unit 1 includes a CPU. The control unit 110 includes a computer having the processing unit 1, memory unit 5, and their peripheral circuits. As functional configurations, the processing unit 1 includes an utterance interpreter 11, an individual feeling estimator 12, a general mood estimator 13, a service decider 14, and a command outputter 15.

The utterance interpreter 11 is responsive to voice signals received from the microphones 7 for determining presence or absence of individual occupant utterances and interpreting gist of the utterances. Specifically, the utterance interpreter 11 identifies occupant seat positions based on signals from the seating sensors 42 and determines presence or absence of utterances of individual occupants by determining whether a voice signal has received from the microphone 7 at the associated seat position. In addition, the utterance interpreter 11 interprets utterance gist by analyzing the voice signal received from the associated microphone 7 with reference to words recorded in a dictionary database (not shown) of the memory unit 5.

The individual feeling estimator 12 estimates feelings of the occupants (individual feelings) from facial expressions (mouth angle etc.) of individual occupants based on picture signals from the cameras 41. For example, the individual feeling estimator 12 uses Plutchik's wheel of emotions to classify occupant emotions into eight basic emotions (anticipation, joy, trust, fear, surprise, sadness, disgust, and anger) and applied emotions by combination of two adjacent basic emotions. Individual feelings are estimated not only from the picture signals from the cameras 41 but also taking voice signals from the microphones 7 into consideration. In other words, an occupant's feelings are matched with one of the emotional states of the wheel of emotions with consideration also to gist of the occupant's utterance, voice intonation and pronunciation of the utterance, and so on.

The individual feeling estimator 12 quantifies individual feelings based on match with the wheel of emotions. For example, a pleasant emotion such as joy (positive emotion) is assigned a positive value and an unpleasant emotion such as sadness (negative emotion) is assigned a negative value. In such case, value (absolute value) representing an emotion is, for example, increased in proportion as the emotion is stronger (as it is closer to the center of the wheel). Whether individual occupants are motionless is determined from the picture signals from the cameras 41, and when an occupant is determined not to have moved, that occupant is assumed to be asleep. In such case, the individual feeling estimator 12 assigns the individual feelings of the sleeping occupant a value of 0, for example.

The general mood estimator 13 estimates the feelings of all occupants as a group (general mood), i.e., general mood in the car, based on the individual feelings of the individual occupants estimated by the individual feeling estimator 12. More specifically, the general mood estimator 13 sums the individual feelings quantified by the individual feeling estimator 12 and divides the sum by the number of occupants detected by the seating sensors 42 to obtain general mood value $\alpha$. As a result, the general mood (feelings) can be quantified as the average of the individual feelings. The larger the general mood value $\alpha$, the more positive the mood, and the more the car atmosphere has livened up.

The service decider 14 decides a service to be provided to all occupants as a group based on the general mood estimated by the general mood estimator 13. For example, when the general mood value $\alpha$ is greater than or equal to a predetermined value $\alpha 1$ which is greater than 0 and the utterance interpreter 11 interprets the gist of an utterance, a lively attitude centered on a common topic can be assumed to have arisen throughout the car. In such a case, the service decider 14 refers to the contents of the topic database 52 and specifies a topic well-matched to a keyword of the utterances. The service decider 14 then selects from among multitudinous information corresponding to the topic stored in the topic database 52 information that is best matched to the general mood and decides the selected information as the service to be provided to the occupants in the form of voice (voice information service). Alternatively, the service decider 14 can access the map database 51 to acquire information on facilities at or near the current car position and decide that this facility information is to be provided as a service in the form of voice in association with, or not in association with, the utterance gist interpreted by the utterance interpreter 11.

On the other hand, when general mood value α is less than predetermined value α1, e.g., when the occupants are not conversing and the general mood value α is 0, it can be assumed that the occupants are silently engrossed in some activity, e.g., enjoying passing scenery through the car windows or operating their mobile terminals, or that they are sleeping. In such a case, the service decider 14 refers to the contents of the music database 53 and selects music suitable for the quiet ambience in the car and decides the selected music as the service to be provided to the occupants (music service). Alternatively, the service decider 14 can ascertain the environment around subject vehicle based on information from the map database 51 and select music suitable for the locality. Selection of music matched to the weather or time of day is also possible. When the gist of utterances has been interpreted, it is further possible to select music suitable for the interpreted gist and decide the selected music as the music service to be provided. An operation implemented by the drive unit 10 (e.g., air-conditioner operation) can also be decided as the service to be provided.

In order to provide services decided by the service decider 14 to the occupants, the command outputter 15 outputs commands to the associated equipment. For example, when the service decider 14 decides that voice information service is to be provided, the command outputter 15 outputs commands to generate voice data corresponding to the voice information concerned and output the result through a D/A converter to the speaker 8. When the service decider 14 decides that music service is to be provided, the command outputter 15 outputs commands to read corresponding music data from the music database 53 and output the data to the speaker 8. When operation of the air-conditioner or the like is decided as a service, the command outputter 15 outputs a control signal to the drive unit 10.

Figure 2:
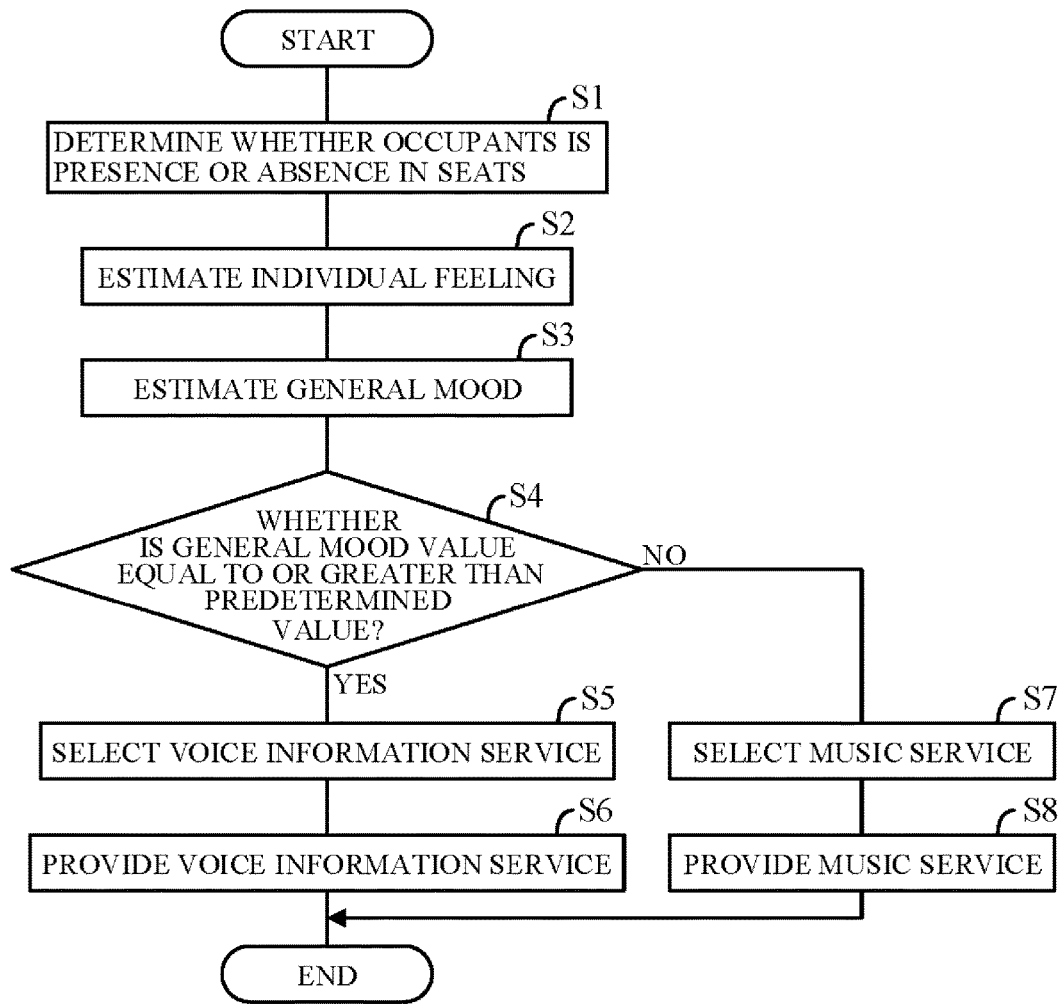
FIG. 2 is a flowchart showing an example of processing performed by a processing unit included in the service providing apparatus of FIG. 1.
Figure 3:
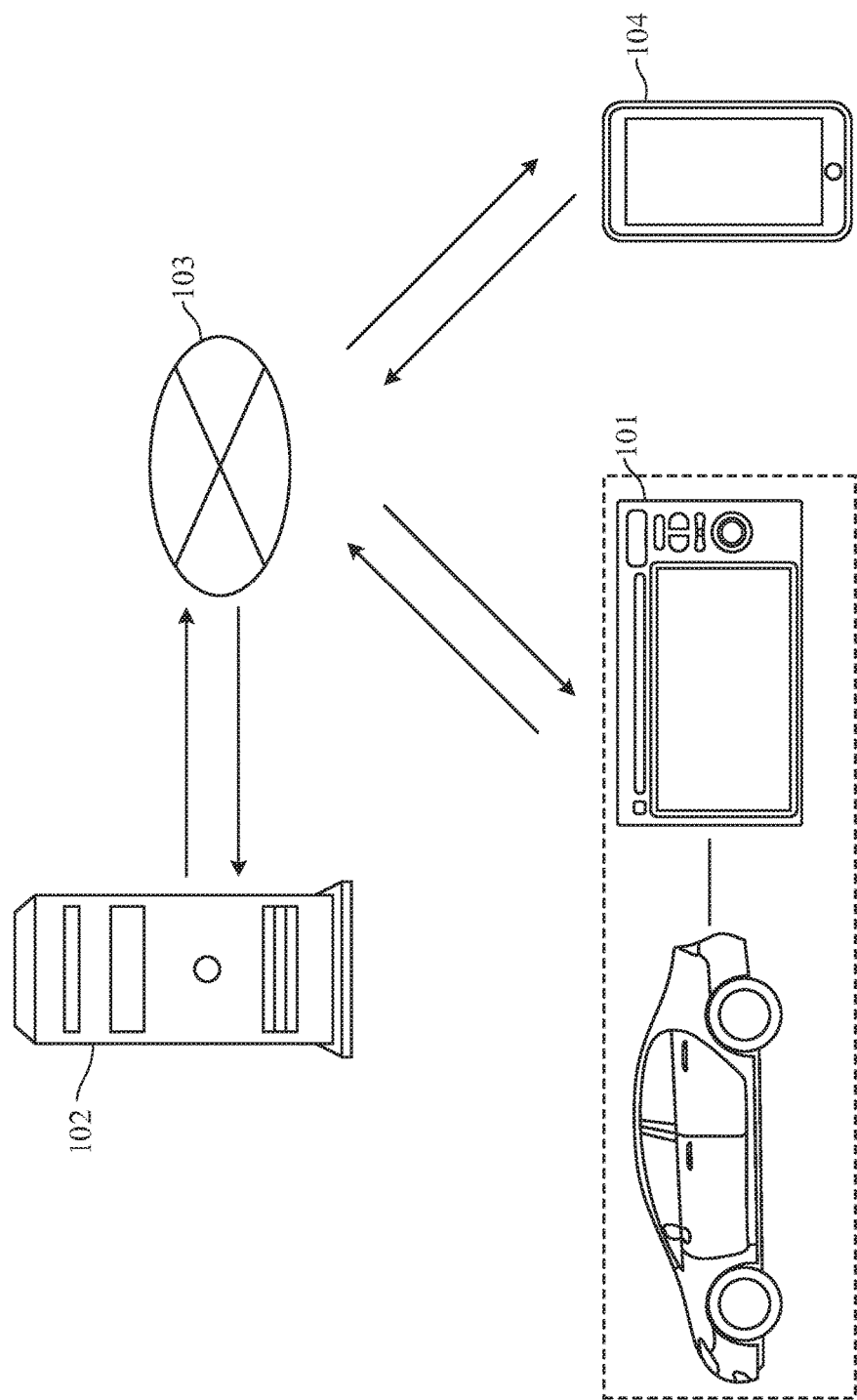
FIG. 3 is a diagram showing a modification of FIG. 1.

FIG. 2 is a flowchart showing an example of processing performed by the processing unit 1 (its CPU) in accordance with a program stored in advance in the memory unit 5 of the control unit 110. The processing of this flowchart is performed repeatedly at predetermined time intervals.

First, in S1 (S: processing Step), presence or absence of occupants in the individual seats is determined from signals obtained from the seating sensors 42. Next, in S2, individual feelings of the individual occupants (individual feelings) are estimated based on signals from the cameras 41. The estimated individual feelings of every car occupant are matched with one of the emotional states of a wheel of emotions categorizing multiple emotions and quantified accordingly. Next, in S3, general mood is estimated based on the individual feelings. Specifically, the quantified individual feelings are summed and the obtained feelings sum is divided by the number of occupants detected by the seating sensors 42 to calculate general mood value α.

Next, in S4, whether the general mood value α is equal to or greater than predetermined value α1 is determined. In a situation where the occupants in the car are conversing and positive feelings are running high, general mood value α comes to equal or exceed predetermined value α1, whereby the result in S4 becomes YES and the program goes to S5. In S5, voice information service is selected as the service to be provided to the occupants. Specifically, a topic is specified from keywords contained in the utterance gist identified by the utterance interpreter 11 and voice-based information corresponding to that topic is decided as the service to be provided. Next, in S6, a control signal is output to the speaker 8 in order to provide the voice information service to the occupants.

On the other hand, when the result in S4 is NO, the program goes to S7. In S7, music service is selected as the service to be provided to the occupants. In other words, general mood value α can be considered to be less than predetermined value α1 in this case because the car occupants are not conversing. Therefore, music service is selected so as to play music matched to the quiet ambience in the car. Next, in S8, a control signal is output to the speaker 8 in order to provide the music service to the occupants.

The present embodiment of the invention can achieve advantages and effects such as the following:

(1) The service providing apparatus 100 includes the seating sensors 42 for detecting presence of multiple car occupants, the individual feeling estimator 12 for estimating based on signals from the cameras 41 individual feeling of every car occupant detected by the seating sensors 42, the general mood estimator 13 for estimating general mood, namely, entire feeling of all occupants as a group, based on the individual feeling of every car occupant estimated by the individual feeling estimator 12, the service decider 14 for deciding a service to be provided to all occupants based on the general mood estimated by the general mood estimator 13, and the command outputter 15 for outputting commands in order to provide the service decided by the service decider 14 (FIG. 1). Therefore, since the service provided to the occupants is decided based on the feelings of all occupants as a group, a high degree of satisfaction can be offered to all group occupants.

(2) The individual feeling estimator 12 quantizes the estimated individual feeling of every car occupant, and the general mood estimator 13 divides the sum of the individual feelings quantized by the individual feeling estimator 12 by the total number of occupants detected by the seating sensors 42, thereby quantizing the general mood of the occupants as a group. Since the general mood is quantized in this manner, the general mood can be quantitatively evaluated and the best service to provide to the occupants be easily decided.

(3) The service providing apparatus 100 includes the cameras 41 that detect motions of the occupants, and the individual feeling estimator 12 estimates individual feelings based on the motions of the occupants detected by the cameras 41. The individual feelings of a sleeping occupant who doesn't move can therefore be assigned a value of 0. This ability to evaluate the individual feelings of sleeping occupants facilitates inference of the general mood of the occupants as a group.

(4) The service providing apparatus 100 further includes the utterance interpreter 11 that interprets the gist of individual occupant utterances based on voice signals received from the microphones 7, and the service decider 14 selects a service to be provided to the car occupants as a group from among multiple services including voice information services that provide information related to the gist of the utterances interpreted by the utterance interpreter 11 in a form of voice, and music services that provide music, based on the general mood estimated by the general mood estimator 13 (S5, S7). As a result, a service deemed to be optimum for the general mood of the occupant group can be supplied from among, inter alia, voice information services and music services. This means that when the ambience in the car is bright and lively, a topic that helps to prolong the vivacity can be provided, and when the ambience is quiet, music matched to the calm atmosphere can be provided. Therefore, atmosphere maintained in the car helps the driver to remain mentally calm while driving.

(5) When no gist is interpreted by the utterance interpreter 11, the service decider 14 selects music service as the service to be provided to the group of occupants (S7). This prevents emergence of a tense atmosphere when the car interior falls silent despite a state that two or more occupants are in the cabin. Therefore, it helps to put everyone, including the driver, at ease.

Variously modified embodiments of the present invention are possible without limitation to the above embodiment. Although in the above embodiment (FIG. 1), the service providing apparatus 100 is configured using a navigation apparatus, a service providing apparatus is not limited to this configuration. FIG. 3 is a diagram showing a modification of FIG. 1. In FIG. 3, a configuration is adopted wherein at least some of the databases 51 to 53 stored in the memory unit 5 of FIG. 1 are stored in a server 102, and a speech dialog unit 101 acquires various information from the server 102 through the wireless device 6 (FIG. 1) and a wireless communication network, the Internet, a telephone network or other communication network 103. At least some functions of the speech dialog unit 101 can be implemented by a mobile wireless terminal 104 carried by the driver. For example, position information possessed by the mobile wireless terminal 104 can be transmitted from the mobile wireless terminal 104 to the server 102 through the communication network 103.

Although in the above embodiment, presence of occupants is detected by the seating sensors 42, it is alternatively possible to detect presence of each of multiple occupants in a vehicle using other an occupant detector such as the cameras 41. In the above embodiment, the cameras 41 detect facial expressions of individual occupants and the individual feeling estimator 12 estimates individual feelings of the individual occupants based on images from the cameras 41. However, it is alternatively possible to detect occupant facial expressions using other equipment and estimate occupant feelings based on the so-obtained facial expressions, and thus the configuration of an individual feeling estimator is not limited to the above configuration. Although in the above embodiment, occupant motions are detected from images taken by the cameras 41, the configuration of a motion detector is not limited to this. Although in the above embodiment, individual feelings are quantized by matching them with emotional state categories of a wheel of emotions, the quantization can be alternatively be performed by matching with other emotional state categories.

In the above embodiment, the general mood estimator 13 quantizes general mood by summing the individual feelings quantified by the individual feeling estimator 12 and dividing by the total number of occupants. However, a general mood estimator can be of any configuration insofar as it is capable of estimating general mood based on an individual feeling of every occupant estimated by an individual feeling estimator. In the above embodiment (FIG. 2), the service decider 14 selects as the service to be provided to the occupants either voice information service (a first service) or music service (a second service), respectively in accordance with whether the general mood value α is equal to or greater than the predetermined value α1 or is less than the predetermined value α1. A service decider can be of any configuration insofar as it is capable of deciding the service to be provided to the group of occupants based on general mood. For example, a service to be provided can be decided by selecting from among multiple services including operations of the drive unit 10. The first service and the second service are not limited to those mentioned above.

The method of providing services can, in other aspects, be of any configuration insofar as it includes detecting presence of each of a plurality of occupants in a vehicle, estimating an individual feeling of the each of the plurality of occupants detected, estimating a general mood representing an entire feeling of the plurality of occupants based on the estimated individual feeling of the each of the plurality of occupants, deciding a service to be provided to a group of the plurality of occupants based on the estimated general mood, and outputting a command to provide the decided service.

The above embodiment can be combined as desired with one or more of the above modifications, and the above modifications can be also combined with each other.

According to the present invention, since a service to be provided to all of a plurality of occupants is decided based on a general mood of the plurality of occupants estimated from an individual feeling of each of the plurality of occupants, a high degree of satisfaction can be offered to all group occupants in a vehicle including occupants which do not join a conversation.

Above, while the present invention has been described with reference to the preferred embodiments thereof, it will be understood, by those skilled in the art, that various changes and modifications may be made thereto without departing from the scope of the appended claims.

What is claimed is:

1. A service providing apparatus, comprising:
an occupant detecting sensor configured to detect presence of each of a plurality of occupants in a vehicle;
an image acquiring sensor configured to acquire an image of a face of the plurality of occupants;
a microphone configured to acquire an utterance of at least one of the plurality of occupants; and
a control unit including a CPU and a memory coupled to the memory, wherein the CPU and the memory are configured to:
estimate an individual feeling of each of the plurality of occupants detected by the occupant detecting sensor, based on the acquired image of the face of the occupant acquired by the image acquiring sensor;
estimate a general mood representing an entire feeling of the plurality of occupants, based on the estimated individual feeling of each of the plurality of occupants;
interpret a gist of an utterance of at least one of the plurality of occupants, based on the utterance acquired by the microphone;
select a voice information service providing information on the interpreted gist of the utterance when the estimated general mood is more than or equal to a predetermined value, and select a music service providing music when the estimated general mood is less than the predetermined value; and
output a command to provide the selected service.

2. The apparatus according to claim 1, wherein the CPU and the memory are configured to:
qualify the individual feeling of each of the plurality of occupants, and
qualify the general mood by dividing a sum of the qualified individual feeling for each of the plurality of occupants by a total number of the plurality of occupants detected.

3. The apparatus according to claim 1, further comprising a motion detector configured to detect a motion of each of the plurality of occupants, wherein the CPU and the memory are configured to:

estimate the individual feeling based on the motion detected by the motion detector.

4. The apparatus according to claim 1, wherein the CPU and the memory are configured to:
select the music service when the gist of the utterance is not interpreted.

5. A service providing apparatus, comprising:
an occupant detecting sensor configured to detect presence of each of a plurality of occupants in a vehicle;
an image acquiring sensor configured to acquire an image of a face of the plurality of occupants;
a microphone configured to acquire an utterance of at least one of the plurality of occupants; and
an electric control unit having a microprocessor and a memory, wherein the microprocessor is configured to function as:
an individual feeling estimator configured to estimate an individual feeling of the each of the plurality of occupants detected by the occupant detecting sensor, based on the acquired image acquired by the image acquiring sensor;
a general mood estimator configured to estimate a general mood representing an entire feeling of the plurality of occupants, based on the individual feeling of the each of the plurality of occupants estimated by the individual feeling estimator;
an utterance interpreter configured to interpret a gist of an utterance of at least one of the plurality of occupants, based on the utterance acquired by the microphone;
a service decider configured to select a voice information service providing information on the gist of the utterance interpreted by the utterance interpreter when the estimated general mood is more than or equal to a predetermined value, and to select a music service providing music when the estimated general mood is less than the predetermined value; and
a command outputter configured to output a command to provide the service selected by the service decider.

6. The apparatus according to claim 5, wherein:
the individual feeling estimator is configured to qualify the individual feeling of each of the plurality of occupants, and
the general mood estimator is configured to qualify the general mood by dividing a sum of the individual feeling qualified by the individual feeling estimator for each of the plurality of occupants by a total number of the plurality of occupants detected by the occupant detector.

7. The apparatus according to claim 5, further comprising a motion detector configured to detect a motion of each of the plurality of occupants,
wherein the individual feeling estimator is configured to estimate the individual feeling based on the motion detected by the motion detector.

8. The apparatus according to claim 5, wherein the service decider is configured to select the music service when the gist of the utterance is not interpreted by the utterance interpreter.

9. A service providing method, comprising:
detecting presence of each of a plurality of occupants in a vehicle;
acquiring images of faces of the plurality of occupants;
acquiring an utterance of at least one of the occupants;
estimating an individual feeling of each of the plurality of occupants detected, based on the acquired images of the faces of the plurality of occupants;
estimating a general mood representing an entire feeling of the plurality of occupants, based on the estimated individual feeling of each of the plurality of occupants;
interpreting a gist of the utterance of the at least one of the occupants;
selecting a voice information service providing information on the interpreted gist of the utterance when the estimated general mood is more than or equal to a predetermined value;
selecting a music service providing music when the estimated general mood is less than the predetermined value; and
outputting a command to provide the selected service.

10. The method according to claim 9, wherein:
estimating the individual feeling comprises qualifying the individual feeling of each of the plurality of occupants, and
estimating the general mood comprises qualifying the general mood by dividing a sum of the qualified individual feeling for each of the plurality of occupants by a total number of the plurality of occupants detected.

11. The method according to claim 9, further comprising detecting a motion of each of the plurality of occupants,
wherein estimating the individual feeling comprises estimating the individual feeling based on the detected motion.

12. The method according to claim 9, wherein selecting the service comprises selecting the music service when the gist of the utterance is not interpreted.

* * * * *